United States Patent [19]
Nolan

[11] 4,002,828
[45] Jan. 11, 1977

[54] METHOD AND CIRCUIT FOR GENERATING GRAY SCALE IN GASEOUS DISCHARGE PANELS

[75] Inventor: James F. Nolan, Sylvania, Ohio
[73] Assignee: Owens-Illinois, Inc., Toledo, Ohio
[22] Filed: Nov. 28, 1975
[21] Appl. No.: 635,801
[52] U.S. Cl. .................. 358/240; 315/169 TV; 340/324 M
[51] Int. Cl.² .................. H04N 5/66; H04N 3/10
[58] Field of Search .......... 178/7.3 D; 315/169 TV; 340/324 M, 343

*Primary Examiner*—Robert L. Richardson
*Attorney, Agent, or Firm*—David H. Wilson, Jr.

[57] ABSTRACT

A method and circuit for obtaining gray scale in gas discharge display panels which uses only one discharge site per resolution element, does not require extensive electronic memory and provides a continuous, broad intensity range. A maintain voltage is applied to all elements of the matrix display panel which has a magnitude somewhat less than the lower limit of the bistable region in which gas discharge panels are normally operated. Thus, a site cannot be turned "on" in the normal sense of initiating a sequence of discharges which continues indefinitely. However, the application of a trigger voltage can initiate a sequence of discharges which continues for a substantial number of cycles before dying out. The number of cycles for which the discharge sequence persists depends on the magnitude and duration of the addressing trigger voltage. If the panel is operated in a refresh mode (the addressing pulses are applied repetitively), the average brightness of the light emitted may be controlled by varing the magnitude of the trigger pulse voltage to obtain a luminance range of more than 30 to one. This gray scale method may be used to address a matrix display panel with video information using a line-at-a-time addressing with red, green and blue phosphors.

36 Claims, 12 Drawing Figures

METHOD AND CIRCUIT FOR GENERATING GRAY SCALE IN GASEOUS DISCHARGE PANELS

BACKGROUND OF THE INVENTION

1. Field of the Invention

This invention relates to a method and system for producing multiple intensity or gray scale operation in a gaseous discharge display panel.

2. Description of the Prior Art

Multiple cell gas discharge display and/or memory panels of one particular type with which the present invention is concerned are characterized by an ionizable gaseous medium, usually a mixture of at least two gases at an appropriate gas pressure, in a thin gas chamber or space between a pair of opposed dielectric charge storage members. The dielectric charge storage members are typically backed by arrays of electrodes which are appropriately oriented so as to define a plurality of discrete gas discharge units or cells.

In some prior art panels, the discharge cells are additionally defined by surrounding or confining physical structure such as apertures in perforated glass plates and the like so as to be physically isolated relative to other cells. In either case, with or without the confining physical structure, electronic charges (electrons and ions) produced upon ionization of the gas volume of a selected discharge cell, when proper alternating operating potentials are applied to selected conductors thereof, are collected upon the surfaces of the dielectric at specifically defined locations. These charges constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of substantial conductive current from the conductor members to the gaseous medium and also serve as collecting surfaces for ionized gaseous medium charges (electrons and ions) during the alternate half cycles of the A. C. operating potentials, Such charges collect first on one elemental or discrete dielectric surface area and then on an opposing elemental or discrete dielectric surface area on alternate half cycles to constitute an electrical memory.

An example of a panel structure containing non-physically isolated or open discharge cells is disclosed in U.S. Pat. No. 3,499,167 (incorporated herein by reference) issued to Theodore C. Baker, et al.

An example of a panel containing physically isolated cells is disclosed in the article by D. L. Bitzer and H. G. Slottow entitled "The Plasma Display Panel-A Digitally Addressable Display With Inherent Memory," Proceeding of the Fall Joint Computer Conference, IEEE, San Francisco, California, November, 1966, pages 541–547 and also in U.S. Pat. No. 3,559,190 (incorporated herein by reference) issued to D. L. Bitzer et al.

In the construction of the panel, a continuous volume of ionizable gas is confined between a pair of dielectric surfaces backed by electrode arrays typically forming matrix elements. The two electrode arrays may be orthogonally related sets of parallel lines (but any other configuration of electrode arrays may be used). The two arrays define at their intersections a plurality of opposed pairs of charge storage areas on the surfaces of the dielectric bounding or confining the gas. Thus, for an electrode matrix having H rows and C columns the number of elemental or discrete charge storage areas will be twice the number of elemental discharge cells.

In addition to the matrix configuration, the electrode arrays of the display device may be shaped otherwise. Accordingly, while the typical electrode arrangement is of the crossed grid type as discussed herein, it is likewise apparent that where a maximal variety of two dimensional display patterns is not necessary, as where specific standardized visual shapes (e.g., numerals, letters words, etc.) are to be formed and image resolution is not critical, the electrode may be shaped accordingly (e.g., a segmented digit display).

Gas discharge display panels are normally operated in the bistable memory mode. In this mode there are two intensity states, on and off. A number of techniques have been proposed for obtaining multiple intensity or gray scale operation in these panels. The basic five categories of operation are:

1. Spatial gray scale—More than one discharge site is used per resolution element and the intensity is varied by varying the number of sites turned on. Such a system is disclosed in U.S. Pat. No. 3,845,243 issued to Larry J. Schmersal et al. The discharge panel is divided into a number of discharge regions each having the same number of storage and discharge areas of sites which number is equal to the number of gray levels to be produced. In synchronism with the line by line scanning of an image, a plurality of storage means are loaded for each picture element scanned with a number of information bits which corresponds t the intensity of the picture element scanned. After the scanning of each image line, the stored information corresponding to that line is read out to excite the appropriate number of discharge areas in each discharge region. When viewed from a distance a gray scale if produced.

2. Time modulation of bistable states—Discharge sites are turned on and off at varying times within a refresh period and the intensity is varied by controlling the relative on time. Such a system is disclosed in U.S. Pat. No. 3,863,023 issued to Larry J. Schmersal et al. A number of gray level ranges are defined and an equal number of memory planes are provided, each memory plane having the same number of storage areas as the number of storage and discharge areas in the display panel. An image field is scanned with a vidicon tube and the elements of the signal corresponding to the picture elements are digitized according to the gray level range in which they fall and are fed in sequence to the memory plane corresponding to that gray level. The contents of each memory is then read out to excite the display panel beginning with the memory corresponding to the brightest gray level range and ending with the memory corresponding to the dimmest gray level range. Due to the storage characteristics of the panel, the bits read from the memory corresponding to the brightest gray level range excite corresponding discharge areas of the display panel for a longer period of time than the bits from the memory planes corresponding to the dimmer gray level ranges and the resulting display picture has graduation of gray corresponding to the original scanned image.

3. Multistable states—The cell characteristics and sustain voltage wave form are exploited to give more than one kind of stable discharge sequence resulting in several different levels of intensity. Such operation is limited in the number of intensity levels achieved.

4. Ordered dither—An information processing technique whereby the intensity of each picture element is compared with a positionally dependent threshold giving a spatially varying intensity due to the changing density of bistable discharge sites in the on state.

5. Stacked panels—Superimposing transparent panels one behind the other such that the intensity variations are determined by how many sites at a given location are in the on state.

It has been shown that all of these techniques are capable in principle of providing variable intensity. However, they all have some practical limitations for certain applications. Method 1 reduces the effective resolution of the display panel. Method 2 requires an extensive peripheral electronic memory. Method 3 has a very limited number of intensity levels (for example, three). Method 4 has so far produced only medium quality continuous tone pictures. Method 5 is cumbersome and possibly expensive to implement.

SUMMARY OF THE INVENTION

The present invention provides an alternative technique for operating gas discharge display panels which has advantages over the methods discussed above. It does not sacrifice panel resolution, does not require extensive electronic memory and provides a continuous, broad intensity range with panel designs similar to those used for panels operated in the bistable mode.

The panel has an ionizable gas enclosed between first and second opposed electrode arrays wherein at least one of the electtrode arrays is separated from the gas by a charge collectable dielectric surface. Proximate portions of respective electrodes of the first and second arrays define a plurality of discharge cells.

The technique utilizes unstable sequences of discharge pulses which gradually die out. If an alternating mountain voltage is applied to the opposed electrodes defining a discharge cell, wherein said voltage has a magnitude somewhat less than the lower limit of the bistable region in which gas discharge display panels are normally operated, the cell cannot be turned "on" in the normal sense of initiating a sequence of discharges which continues indefinitely. However, the cell can be turned "on" by a trigger voltage to initiate an unstable sequence of discharges which continues for a substantial number of cycles before dying out. The number of cycles is a function of the magnitude of the trigger voltage all other things being constant. An entire panel can be operated in this manner to generate a gray scale display.

A television picture video analog signal represents video information obtained by horizontally scanning line by line. If a portion of the video signal representing one line is sampled and stored at intervals according to the number of vertical axis electrodes in a gas discharge panel, this information can be written along one horizontal axis panel line during the time the video signal is blanked between lines. The stored signals have magnitudes proportional to the magnitudes of the video signal and are applied to the vertical axis electrodes as a first portion of the trigger voltages while a second portion is applied to a horizontal axis electrode to generate one horizontal line which is a replica of the corresponding lines of the television picture. Each successive horizontal line is generated in a similar manner and interlacing can be used to reduce flicker.

An object of the present invention is to improve the resolution of a gray scale display generated on a gas discharge display panel.

Another object of the present invention is to reduce the electronics associated with the generation of a gray scale display.

A further object of the present invention is to provide a continuous broad range of brightness in gray scale display.

Another object of the present invention is to increase the brightness of a gray scale display by providing for the emission of light for a period considerably longer than the addressing time for a single horizontal line.

BRIEF DESCRIPTION OF THE DRAWINGS

FIGS. 5, 6, 7 and 8 illustrate a gas discharge display/memory panel of the Baker et al type as disclosed in U.S. Pat. No. 3,499,167;

DESCRIPTION OF THE PREFERRED EMBODIMENT

Figure 1:
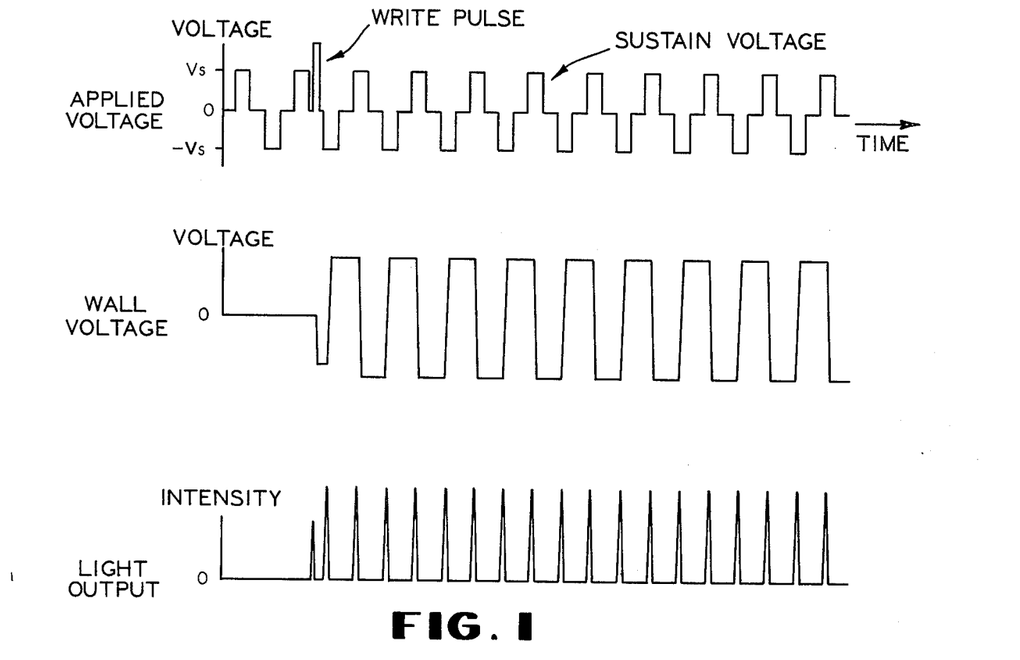
FIG. 1 is a plot against time of the prior art wave forms for bistable operation of a gas discharge cell.

There is shown in FIG. 1 the prior art wave forms associated with the bistable operation of a gas discharge cell. The applied voltage wave form shows a sustaining voltage Vs which is continuously applied to all sites on the panel. The magnitude of the sustaining voltage is insufficient to cause any discharge sites to turn on (i.e., to initiate a stable sequence of discharges), but is sufficient to sustain a discharge sequence once the sequence has been initiated by a "write" pulse applied to the selected site. Because the conducting electrodes are separated from the discharge by a thin layer of insulating dielectric material, the gas discharges occur as short pulses. As the discharge current flows, the electrons and ions accumulate on the insulating surfaces producing an electric field which opposes the field which caused breakdown. The voltage due to these charges on the walls is called the wall voltage. When the polarity of the applied voltage changes, the wall voltage adds to the applied voltage adds to the applied voltage thus producing another discharge pulse. This process repeats every half cycle producing a sequence of discharges which continues indefinitely.

A site may be turned off by applying an appropriate "erase" pulse (not shown) which has the effect of reducing the wall voltage to a level insufficient to reinforce the reversed sustaining voltage to produce a discharge pulse. The sequence of discharge pulse is accompanied by a sequence of light pulses as shown in FIG. 1. The repetition rate of the light pulses is fast enough so that the light appears steady to the human eye. A typical sustaining voltage frequency is in the range 30–50 kHz. The magnitude of the sustaining voltage must be kept within a certain range, the bistable range. If the sustaining voltage is too low, the discharge sequence will not be maintained. If the sustaining voltage is too high, discharge sites will be turned on by the sustaining voltage alone, thus negating the ability to address selected points on the x-y matrix by the application of a write pulse. The memory of the panel is a consequence of the charges stored on the insulating surfaces. For a given display panel, the limits of the bistable range depend on many parameters such as the composition of the fill gas, the gas pressure, the panel geometry and panel materials.

Figure 2:
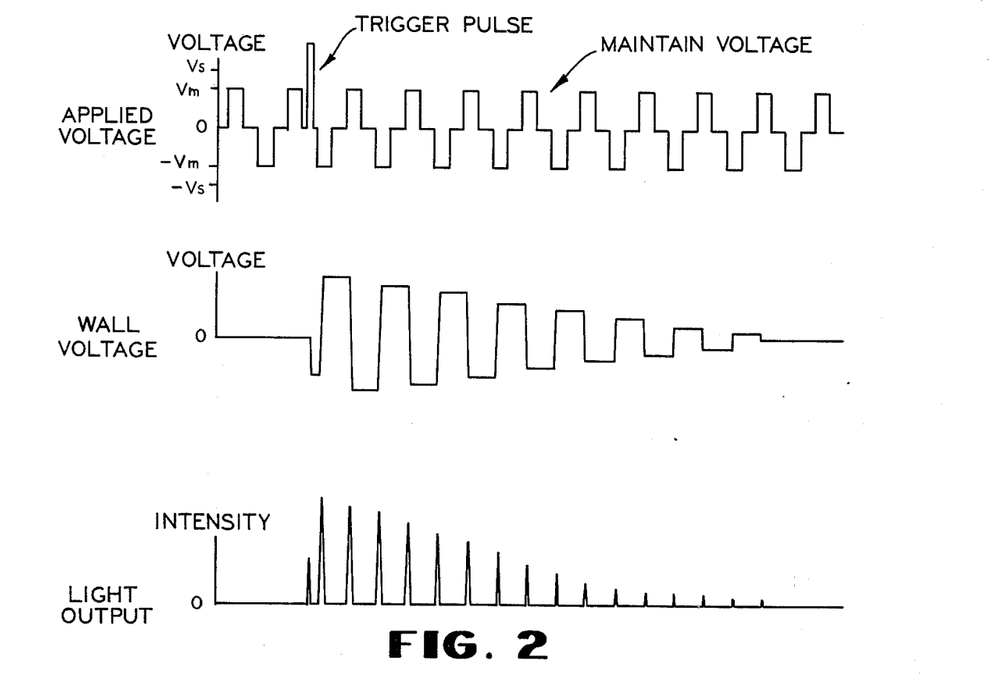
FIG. 2 is a plot against time of the wave forms for gray scale operation of a gas discharge cell according to the present invention.

There is shown in FIG. 2 the wave forms associated with gray scale operation of a gas discharge cell according to the present invention. In the gray scale mode, an alternating voltage is applied to all sites of the panel, but the magnitude of the voltage is below the lower limit of the bistable range. To distinguish this voltage from the sustaining voltage Vs in the bistable range it shall be referred to as the maintain voltage Vm. Since the maintain voltage is below the bistable range it is not possible to retain a site "on" in the normal way, i.e., to initiate a sequence of discharges which continues indefinitely. However, it is possible by the application of an addressing pulse to initiate a sequence of discharges which continues for a substantial number of cycles before dying out, as shown in FIG. 2. The amount of charge transferred in each discharge is somewhat less than that transferred in the preceding discharge. The wall voltage alternates polarity each half cycle with diminishing magnitude and eventually the wall voltage, when added to the maintain voltage, is insufficient to cause a discharge and the sequence stops. Since the diminishing unstable sequence of discharges can be maintained for a substantial number of cycles by charges stored on insulating surfaces, as in the bistable memory mode, this mode of operation will be referred to as the semi-memory mode.

Figure 3:
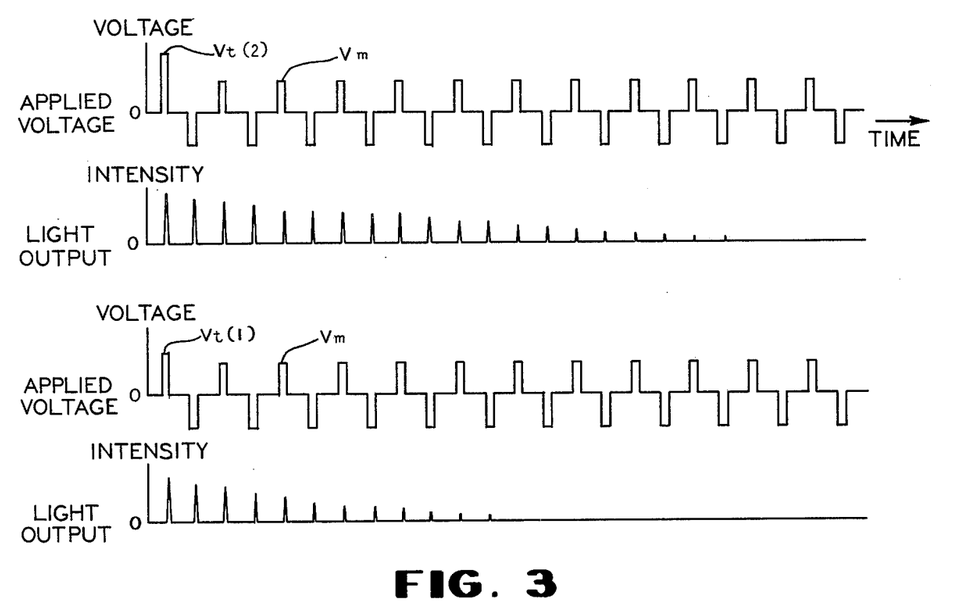
FIG. 3. is a plot against time of the waveforms for gray scale operation which illustrates the relationship between trigger voltage magnitude and discharge sequence duration.

The number of cycles through which the discharge sequence persists depends on many factors such as gas composition, gas pressure, maintain voltage magnitude and wave shape, panel geometry and panel materials. However, if all of these factors are held constant, the length of the diminishing sequence of discharges may be controlled by varying the magnitude of the trigger voltage. A larger trigger voltage will transfer more charge, leading to a larger initial wall voltage and a longer sequence of discharges. This is illustrated in FIG. 3 which shows the applied voltage and light pulses for two discharge sequences with the same maintain voltage Vm but with different trigger voltages, Vt(1) and Vt(2). Vt(2) is greater than Vt(1) and leads to a longer sequence of discharges.

Figure 4:
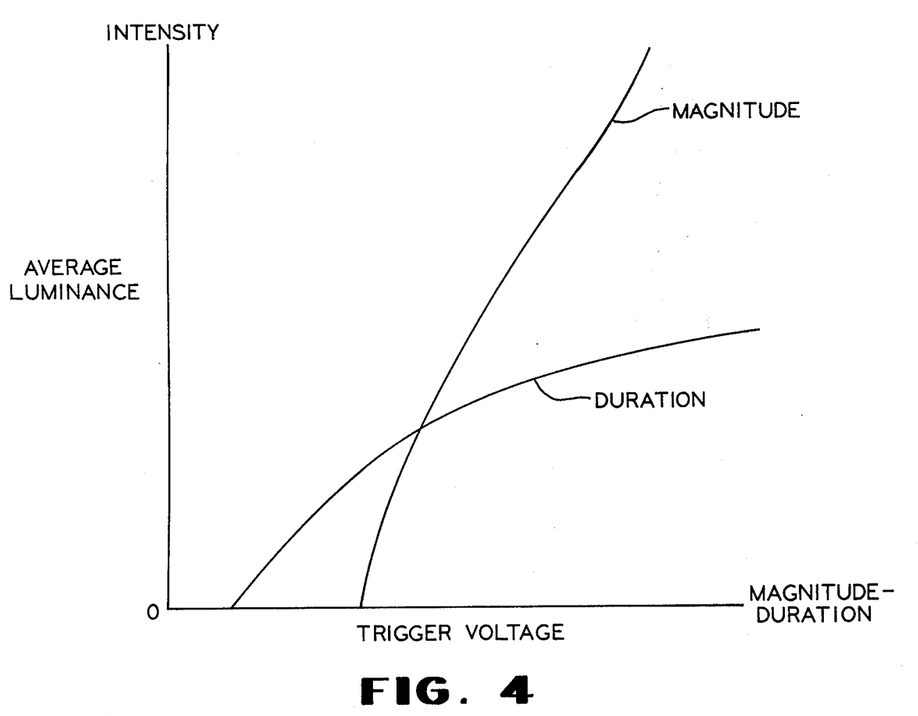
FIG. 4 is a plot of luminance versus trigger voltage magnitude and pulse width for a display panel operated in the refresh mode.

If a trigger voltage is applied repetitively to a discharge site at some regular time interval, the corresponding sequence of discharges occurs repetitively and the site will emit light with an average intensity which depends on the length of the discharge sequence—the longer the sequence, the brighter the average light level. If the panel is operated in a refresh mode at repetition rates fast enough so the human eye does not perceive flicker, the brightness (or luminance) of a site can be controlled by the magnitude and duration of the trigger voltage applied to that site. The larger trigger voltage can also produce discharge pulses which transfer a greater amount of charge such that the individual light pulses are more intense. This can be an additional factor in increasing the average brightness with increasing trigger voltage. The overall effect is indicated schematically in FIG. 4 which is a plot of luminance versus trigger voltage for a panel operated in the refresh mode. In this way the brightness of a site can be controlled by adjusting the magnitude and duration of a repetitively applied trigger voltage. It is not necessary to erase each site at some later intensity dependent time within the refresh cycle. Thus this gray scale technique does not require extensive peripheral memory. All of the gray scale information is contained in the trigger pulse which is applied once each refresh cycle. It is not necessary to ever erase any site. Also, the technique leads to a continuously variable gray scale—intensity variations may be made as large or small as desired by choosing the magnitude and duration of the trigger voltage.

The gray scale wave forms discussed above can be applied to a gas discharge panel similar to the panel disclosed in U.S. Pat. No. 3,499,167.

As illustrated in FIGS. 5 through 8, the Baker et al device utilizes a pair of dielectric films 31 and 32 separated by a thin layer or volume of a gaseous discharge medium 33. The medium 33 produces a copious supply of charges (ions and electrons) which are alternately collectable on the surfaces of the dielectric members at opposed or facing elemental or discrete areas X and Y defined by the electrode matrix on non-gas-contacting sides of the dielectric members, each dielectric member presenting large open surface areas and a plurality of pairs of elemental X and Y areas. While the electrically operative structural members such as the dielectric members 31 and 32 and a pair of electrode matrixes 34 and 35 are all relatively thin (being exaggerated in thickness in the drawings) they are formed on and supported by a pair of rigid nonconductive support members 36 and 37 respectively.

Preferably, one or both of the nonconductive support members 36 and 37 pass light produced by discharge in the elemental gas volumes. Typically, they are transparent glass members and these members essentially define the overall thickness and strength of the panel. For example, this thickness of the gas layer 33 as determined by a spacer 38 is usually under 10 mils for operation in the memory mode, the dielectric layers 31 and 32 (over the electrodes at the elemental or discrete X and Y areas) are usualy between 1 and 2 mils thick, and the electrodes 31 and 32 about 8,000 angstroms thick. However, the support members 36 and 37 are much thicker (particularly in larger panels) so as to provide as much ruggedness as may be desired to compensate for stresses in the panel. The support members 36 and 37 also serve as heat sinks for heat generated by discharges and thus minimize the effect of temperature on operation of the device.

Except for being nonconductive or good insulators, the electrical properties of the support members 36 and 37 are not critical. The main function of the support members 36 and 37 is to provide mechanical support and strength for the entire panel, particularly with respect to pressure differential acting on the panel and thermal shock. It is noted that they should have thermal expansion characteristics substantially matching the thermal expansion characteristics of the dielectric layers 31 and 32. Ordinary ¼ inch commercial grade soda lime plate glasses have been used for this purpose. Other glasses such as low expansion glasses or transparent devitrified glasses can be used provided they can withstand processing and have expansion characteristics substantially matching expansion characteristics of the dielectric coatings 31 and 32. For given pressure differentials and thickness of plates, the stress and deflection of plates maybe determined by following standard stress and strain formulas (see R. J. Roark, *Formulas for Stress and Strain*, McGraw-Hill, 1954).

The spacer 38 may be made of the same glass material as the dielectric films 31 and 32 and may be an integral rib formed on one of the dielectric members and fused to the other members to form a bakeable hermatic seal enclosing and confining the ionizable gas volume 33. However, a separate final hermetic seal may be effected by a high strength devitrified glass sealant 39. A tubulation 41 is provided for exhausting the space between the dielectric members 31 and 32 and filling that space with the volume of ionizable gas. For large panels, small beadlike solder glass spacers, such as shown at 42, may be located between conductor intersections and fused to the dielectric members 31 and 32 to aid in withstanding stress on the panel and maintain uniformity of thickness of the gas volume 33.

The electrode arrays 34 and 35 may be formed on the support members 36 and 37 by a number of well-known processes, such as photoetching, vacuum deposition, stencil screening, etc. In the panel shown in FIG. 8, the center-to-center spacing of the electrodes is the respective arrays in about 17 mils. Transparent or semi-transparent conductive material such as tin oxide, gold, or aluminum can be used to form the electrode arrays and should have a resistance less than 3000 ohms per line. Narrow opaque electrodes may alternately be used so that discharge light passes around the edges of the electrodes to the viewer. It is important to select an electrode material that is not attacked during processing by the dielectric material.

It will be appreciated that the electrode arrays 34 and 35 may be wires or filaments of copper, gold, silver or aluminum or any other conductive metal or material. For example, 1 mil wire filaments are commercially available and may be used in the invention. However, formed in situ electrode arrays are preferred since they may be more easily and uniformly placed on and adhered to the support plates 36 and 37.

The dielectric layer members 31 and 32 are formed on an inorganic material and are preferably formed in situ as an adherent film or coating which is not chemically or physically affected during bake-out of the panel. One such material is a solder glass such a Kimble SG-68 manufactured by and commercially available from the assignee of the present invention.

This glass has thermal expansion characteristics substantially matching the thermal expansion characteristics of certain soda-lime glasses, and can be used as the dielecteic layer when the support members 36 and 37 are soda-lime glass plates. The dielectric layers 31 and 32 must be smooth and have a dielectric breakdown voltage of about 1000 v. and be electrically homogeneous on a microscopic scale (e.g., no cracks, bubbles, crystals, dirt, surface films, etc.). In addition, the surfaces of the dielectric layers 31 and 32 should be good photoemitters of electrons in a baked out condition. Alternatively, the dielectric layers 31 and 32 may be overcoated with materials designed to produce good electron emission, as in U.S. Pat. No. 3,634,719, issued to Roger E. Ernsthausen. Of course, for an optical display at least one of the dielectric layers 31 and 32 should pass light generated on discharge and be transparent or translucent and, preferably, both layers are optically transparent.

Figure 5:
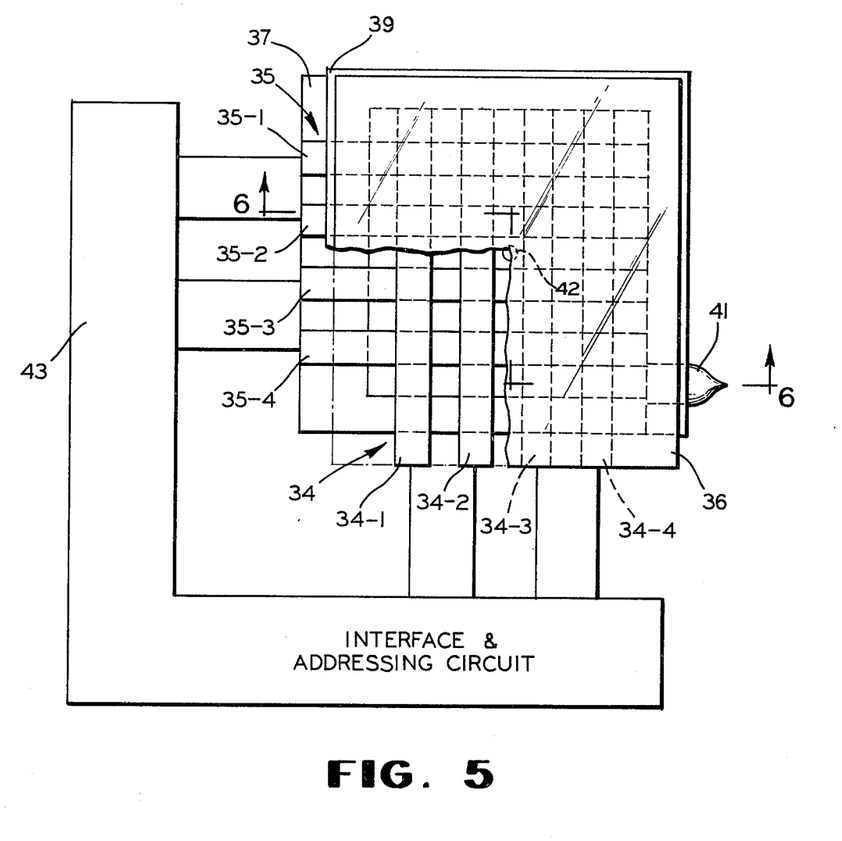
FIG. 5 is a partially cut-away plan view of a gas discharge display/memory panel as connected to a diagrammatically illustrated source of operating potentials.
Figure 6:
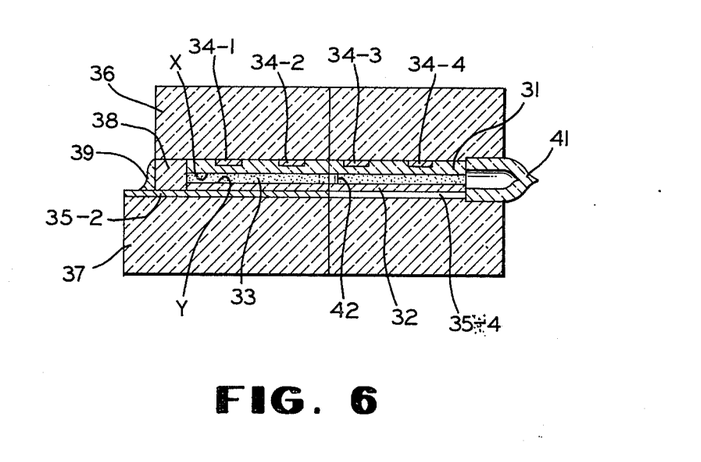
FIG. 6 is a cross-sectional view (enlarged, but not to proportional scale since the thickness of the gas volume, dielectric members and electrode arrays have been enlarged for purposes of illustration) taken on lines 6—6 of FIG. 5.

The preferred spacing between surfaces of the dielectric films is about 4 to 8 mils with the electrode arrays 34 and 35 having center-to center spacing of about 17 mils. The ends of the electrodes 35-1 through 35-4 and the support member 37 extend beyond the enclosed gas volume 33 and are exposed for the purpose of making electrical connection to an interface and addressing circuit 43. Likewise, the ends of the electrodes 34-1 through 34-4 on the support member 36 extend beyond the enclosed gas volume 33 and are exposed for the purpose of making electrical connection to interface and addressing circuit 43.

As in known display systems, the interface and addressing circuit or system 43 may be relatively inexpensive line scan systems or the somewhat more expensive high speed random access systems. In either case, it is to be noted that a lower amplitude of operating potentials helps to produce problems associated with the interface circuitry between the addressing system and the display/memory panel, per se. Thus, by providing a panel having greater uniformity in the discharge characteristics throughout the panel, tolerances and operating characteristics of the panel with which the interfacing circuitry cooperate, are made less rigid.

The bistable mode of initiating operation of the panel will be described with reference to FIG. 7, which illustrates the condition of one elemental gas volume 44 having an elemental cross-sectional area and volume which is quite small relative to the entire volume and cross-sectional area of the gas 33. The cross-sectional area of the volume 44 is defined by the overlapping common elemental areas of the electrode arrays and the volume is equal to the product of the distance between the dielectric surfaces and the elemental area. It is apparent that if the electrode arrays are uniform and linear and are orthogonally (at right angles to each other) related, each of elemental areas X and Y will be squares and if the electrodes of one electrode array are wider than the electrodes of the other electrode array, said areas will be rectangles. If the electrode arrays are at transverse angles relative to each other, other than 90, the areas will be diamond shaped so that the cross-sectional shape of each volume is determined solely in the first instance by the shape of common area of overlap between the electrodes in the electrode arrays 34 and 35. The dotted lines 44' are imaginary lines to show a boundary of one elemental volume about the center of which each elemental discharge takes place. As described earlier herein, it is known that the cross-sectional area of the discharge in a gas is affected by, inter alia, the pressure of the gas, such that, if desired, the discharge may even be constricted to within an area smaller than the area of electrode overlap. By utilization of this phenomenon, the light production may be confined or resolved substantially to the area of the elemental cross-sectional area defined by the electrode overlap. Moreover, by operating at such pressure, charges (ions and electrons) produced on discharge are laterally confined so as to not materially affect operation of adjacent elemental discharge volumes.

Figure 7:
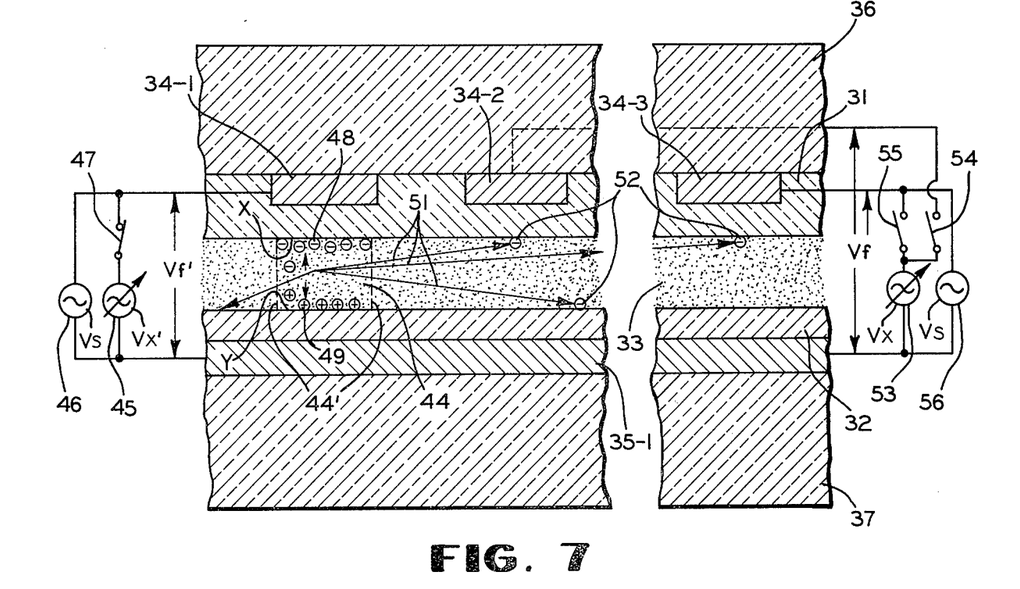
FIG. 7 is an explanatory partial cross-sectional view similar to FIG. 6 (enlarged, but not to proportional scale)

In the instant shown in FIG. 7, a conditioning discharge about the center of the elemental volume 44 has been initiated by application to the electrode 34-1 and the electrode 35-1 firing potential Vx' as derived from a source 45 of variable phase, for example, and source 46 of sustaining potential Vs (which may be a sine wave, for example). The potential Vx' is added to the sustaining potential Vs as the sustaining potential Vs increases in magnitude to initiate the conditioning discharge about the center of the elemental volume 44 shown in FIG. 7. There, the phase of the source 45 of potential Vx' has been adjusted into adding relation to the alternating voltage from the source 46 of the sustaining voltage Vs to provide a voltage Vf', when a switch 47 has been closed, to the electrodes 34-1 and 35-1 defining the elemental gas volume 44 sufficient (in time and/or magnitude) to produce a light generating discharge centered about the discrete elemental gas volume 44. At the instant shown, since electrode 34-1 is at a positive potential, a plurality of electrons 48 have collected on and are moving to an elemental area of the dielectric member 31 substantially corresponding to the area of the elemental gas volume 44 and a plurality of the less mobile positive ions 49 are beginning to collect on the opposed elemental area of the dielectric member 32 since it is at a negative potential. As these changes build up, they constitute a back voltage opposed to the voltage applied to the electrodes 34-1 and 35-1 and serve to terminate the discharge in the elemental gas volume 44 for the remainder of a half cycle.

During the discharge about the center of the elemental gas volume 44, photons are produced which are free to move or pass through the gas medium 33 as indicated by a plurality of arrows 51, to strike or impact remote surface areas of the photoemissive dielectric members 31 and 32, causing such remote areas to release a plurality of electrons 52. The electrons 52 are, in effect, free electrons in the gas medium 33 and condition other discrete elemental gas volumes for operation at a lower firing potential Vf which is lower in magnitude than the firing potential Vf' for the initial discharge about the center of the elemental volume 44. This voltage is substantially uniform for each other elemental gas volume.

Thus, elimination of the physical obstructions or barriers between discrete elemental volumes permits photons to travel via the space occupied by the gas medium 33 to impact remote surface areas of the dielectric members 31 and 32 and provides a mechanism for supplying free electrons to all elemental gas volumes. These free electrons condition all discrete elemental gas volumes for subsequent discharges, respectively, at a uniform lower applied potential. While in FIG. 7 a single elemental volume 44 is shown, it will be appreciated that an entire row (or column of elemental gas volumes may be maintained in a "fired" condition during normal operation of the device with the light produced thereby being masked or blocked off from the normal viewing area and not used for display purposes. It can be expected that in some applications there will always be at least one elemental volume in a "fired" condition and producing light in a panel, and in such applications it is not necessary to provide separate discharge or generation of photons for purposes described earlier.

The prior art has taught that the entire gas volume can be conditioned for operation at uniform firing potentials by use of external or internal radiation so that there will be not need for a separate source of higher potential for initiating an initial discharge. Thus, by radiating the panel with ultraviolet radiation or by inclusion of a radioactive material within the glass materials or gas space, all discharge volumes can be operated at uniform potentials from the addressing and interface circuit 43.

Since each discharge is terminated upon a build up or storage of charges at opposed pairs of elemental areas, the light produced is likewise terminated. In fact, light production lasts for only a small fraction of a half cycle of applied alternating potential and depending on design parameters, is in the microsecond range.

After the initial firing or discharge of the discrete elemental gas volume 44 by a firing potential Vf', the switch 47 may be opened so that only the sustaining voltage Vs from the source 46 is applied to the electrodes 34-1 and 35-1. Due to the storage of the charges (e.g., the memory) at the opposed elemental areas X and Y, the elemental gas volume 44 will discharge again at or near the peak of the negative half cycles of the sustaining voltage Vs to again produce a momentary pulse of light. At this time, due to the reversal of field direction, the electrons 48 will collect on and be stored on the elemental surface area Y of the dielectric member 32 and the positive ions 49 will collect and be stored on the elemental surface area X of the dielectric member 31. After a few cycles of the sustaining voltage Vs, the times of discharges become symmetrically located with respect to the wave form of the sustaining voltage. At the remove elemental volumes, as for example, the elemental volumes defined by the electrode 35-1 with the electrodes 34-2 and 34-3, a uniform magnitude or potential Vx from a source 53 is selectively added by one or both of a pair of switches 54 or 55 to the sustaining voltage Vs, generated by a voltage source 56, to fire one or both of these elemental discharge volumes. Due to the presence of free electrons produced as a result of the discharge centered about the elemental volume 44, each of these remote discrete elemental volumes have been conditioned for operation at uniform firing potential Vf.

The elemental gas volume 44 of FIG. 7 can be operated in the semi-memory mode according to the present invention. The sustaining voltage Vs sources 46 and 56 are replaced by sources of a maintain voltage Vm and the firing potential voltage Vx' source 45 and Vx source 53 are replaced by sources of the trigger voltages Vt(1) and Vt(2) having the wave forms shown in FIG. 3. After trigger voltage is applied, the gas discharges generated on the half cycles of the maintain voltage die or decay with time.

It is apparent that the plates 36 and 37 need not be flat but may be curved, the curvature of facing surfaces of each plate being complementary to each other. While the preferred conductor arrangement is of the crossed grid type as shown herein, it is likewise apparent that where an infinite variety of two dimensional display patterns are not necessary, as where specific standarized visual shapes (e.g., numerals, letters, words, etc.) are to be formed and image resolution is not critical, the conductors may be shaped accordingly.

Figure 8:
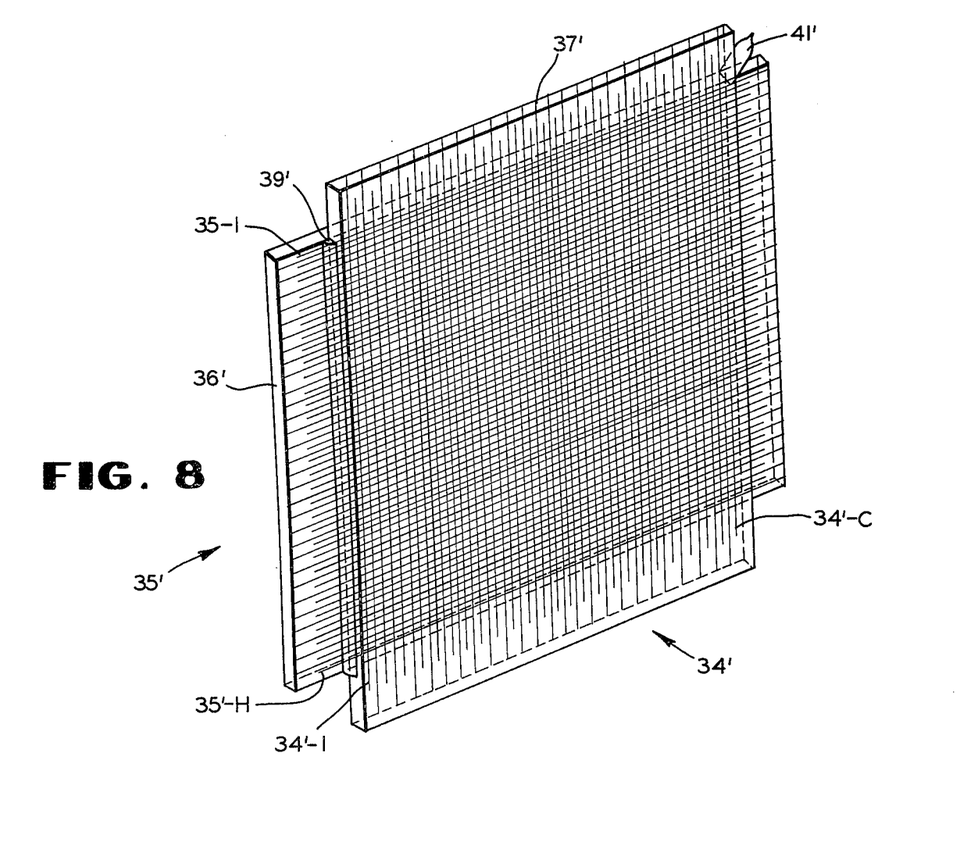
FIG. 8 is an isometric view of a gas discharge display/memory panel.

The device shown in FIG. 8 is a panel having a large number of elemental volumes similar to the elemental volume 44 of FIG. 7. In this case more room is provided to make electrical connection to the electrode arrays 34' and 35', respectively, by extending the surfaces of the support members 36' and 37' beyond the seal 39', alternate electrodes being extended on alternate sides. The electrode arrays 34' and 35' as well as the support members 36' and 37' are transparent so that the panel may be viewed from either side. The panel can include red, green and blue phosphors associated with individual discharge cells as disclosed in U.S. Pat. No. 3,878,422 issured to F. H. Brown et al and U.S. Pat. No. 3,909,657 issued to F. H. Brown which are incorporated herein by reference. The panel can be of monolithic design as disclosed in U.S. Pat. No. 3,896,327 issued to J. S. Schermerhorn and incorporated herein by reference.

The support members, the dielectric members, and the dielectric coatings on one side or half of the panel may be dark and/or opaque in order to improve the viewing light contrast on the opposite side of the panel. Reference is made to U.S. Pat. No. 3,686,686 issued to M. S. Hall and incorporated herein by reference.

A wide variety of gases and gas mixtures have been utilized as the gaseous medium in a gas discharge device. Typical of such gases include CO; $CO_2$; halogens; nitrogen; $NH_3$; oxygen; water vapor; hydrogen; hydrocarbons; $P_2O_5$; boron fluoride; acid fumes; $TiCl_4$; air; $H_2O_2$; vapors of sodium, mercury thallium, cadmium, rubidium, and cesium; carbon disulfide; $H_2S$; deoxygenated air; phophorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; the rare or inert gases; and mixtures thereof.

The above described gas discharge panel can be operated so as to obtain a gray scale picture by selectively applying scaled trigger voltage pulses to pairs of electrodes, one electrode from each array, wherein the panel is scanned a line at a time with reference to video input information.

Figure 9:
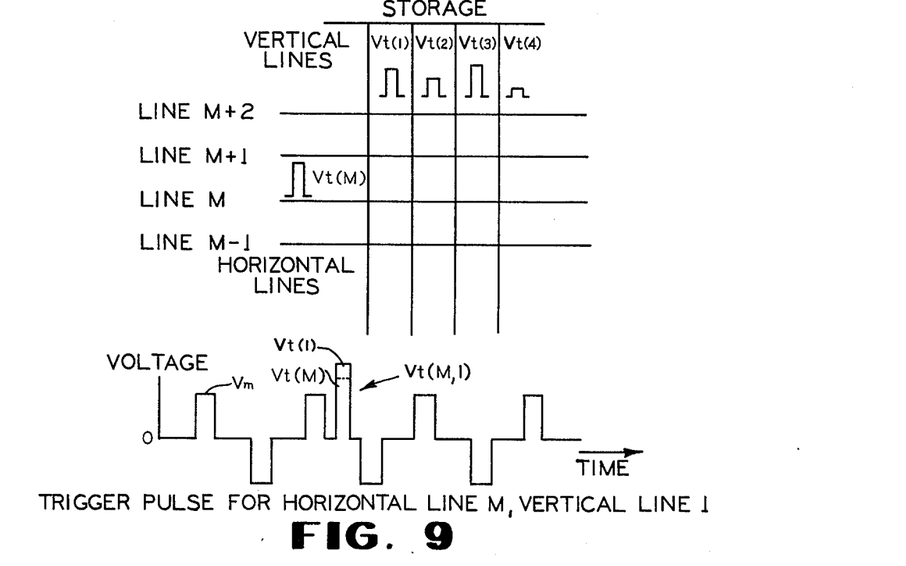
FIG. 9 is a schematic representation of a pair of electrode arrays and a plot against time of the waveofrms for a line by line scan during gray scale operation.

FIG. 9 illustrates one method of addressing a matrix display panel with video information using this gray scale technique. The video information for one line is stored in a storage register and one complete horizontal line is addressed at a time. If the selected horizontal line is referred to as line M, the magnitude of the trigger pulses occurring at various sites on line M will be the sum of two parts: part applied to horizontal line M, Vt(M), and part applied to each vertical line, Vt(1), Vt(2), etc. In general, Vt(M) will be larger than Vt(1) Vt(2), etc. There is a certain threshold voltage for the trigger pulse below which no discharges are caused to occur. This threshold voltage is somewhat larger than the maintain voltage. Vt(M) is set slightly less than this threshold voltage. Then Vt(1), Vt(2), etc., can be smaller than the maintain voltage and will not interfere with sequences of discharges in other horizontal lines (i.e., other than line M) which are not being addressed at this time. The polarity of the addressing pulses is the same as the polarity of the immediately preceding portion of the maintain signal, as illustrated in FIG. 9. This is to ensure that the pulses Vt(1), Vt(2), etc., do not disturb the sequences of discharges occurring in horizontal lines that are not being addressed at this time.

The maintain voltage is applied to all discharge sites of the panel and is a periodic a.c. voltage of magnitude somewhat less than the minimum sustaining voltage required to operate in the memory mode. The addressing pulses (trigger pulses) are applied in parallel to one horizontal line at a time. One line scanning time later (63.5 microseconds for standard TV rates), addressing pulses are applied to the next line, then 63.5 microseconds later to the next line and so on until a TV frame is completed. Then the process is repeated and the panel is addressed, one line at a time, with the video information from the next TV frame. Since the addressing pulses occur one line scanning time apart and since they should not interfere with the maintain voltage, it is required that the frequency of the maintain voltage, $f$, be related to the line scanning time, T1 by the relation $f=n/T1$ where n in an integer. For standard television rates T1=63.5 microseconds which dictates (approximately) the allowed frequencies f=15.75 kHz, 31.5 kHz, 47.25 kHz, 63 kHz, etc. The actual maintain voltage frequency can be chosen to optimize performance.

Figure 10:
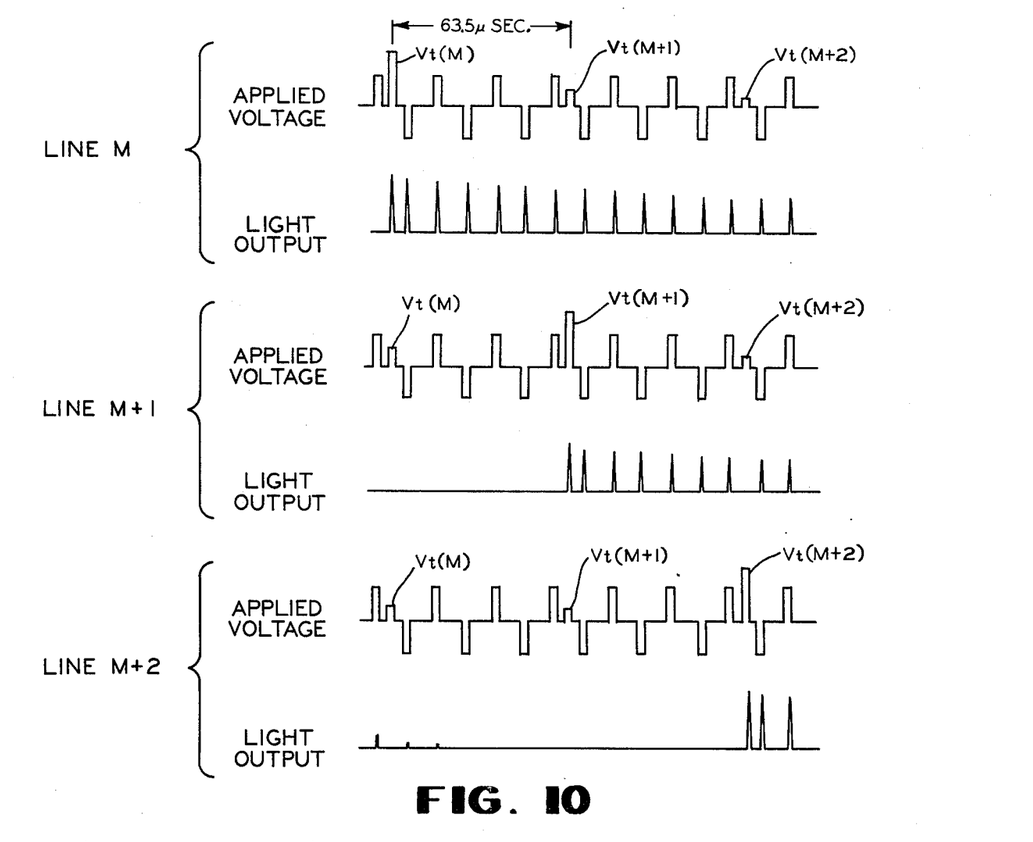
FIG. 10 is a plot against time of the waveforms for successively addressing three of the horizontal lines of the electrode arrays in FIG. 9.

The timing of the addressing pulses for several successive lines is shown in FIG. 10 for a maintain voltage frequency of 47.25 kHz. Note that the sequence of discharges at line M can last much longer than the 63.5 microseconds time interval between addressing line M and line M+1. Therefore, for a given light intensity of the individual pulses, the average brightness can be much greater than it would be if the time available for light emission for a given site were restricted to the addressing time for that line, as it is in many prior art gray scale techniques. Note also that the sequence of discharges on line M is not affected by the addressing pulse on line M+1 even though this pulse occurs during the sequence on line M. This is because the portion of the addressing pulse for line M+1 which appears on line M occurs after the half cycle of the maintain voltage of the same polarity and is too small to caust a discharge. In this way the entire display panel can be addressed sequentially one line at a time.

Measurements have been made on a number of test panels with different characteristics to explore the limits of this gray scale technique. A number of different gas compositions have been tested including neon-based mixtures which produce the familiar red-orange neon color and xenon-based mixtures which can be used to excite phosphors to produce other colors. In general some gray scale can be obtained with most gas mixtures tried, but the degree of control varies with gas composition. Gray scale has been obtained in panels with red, green and blue phosphors.

Figure 11:
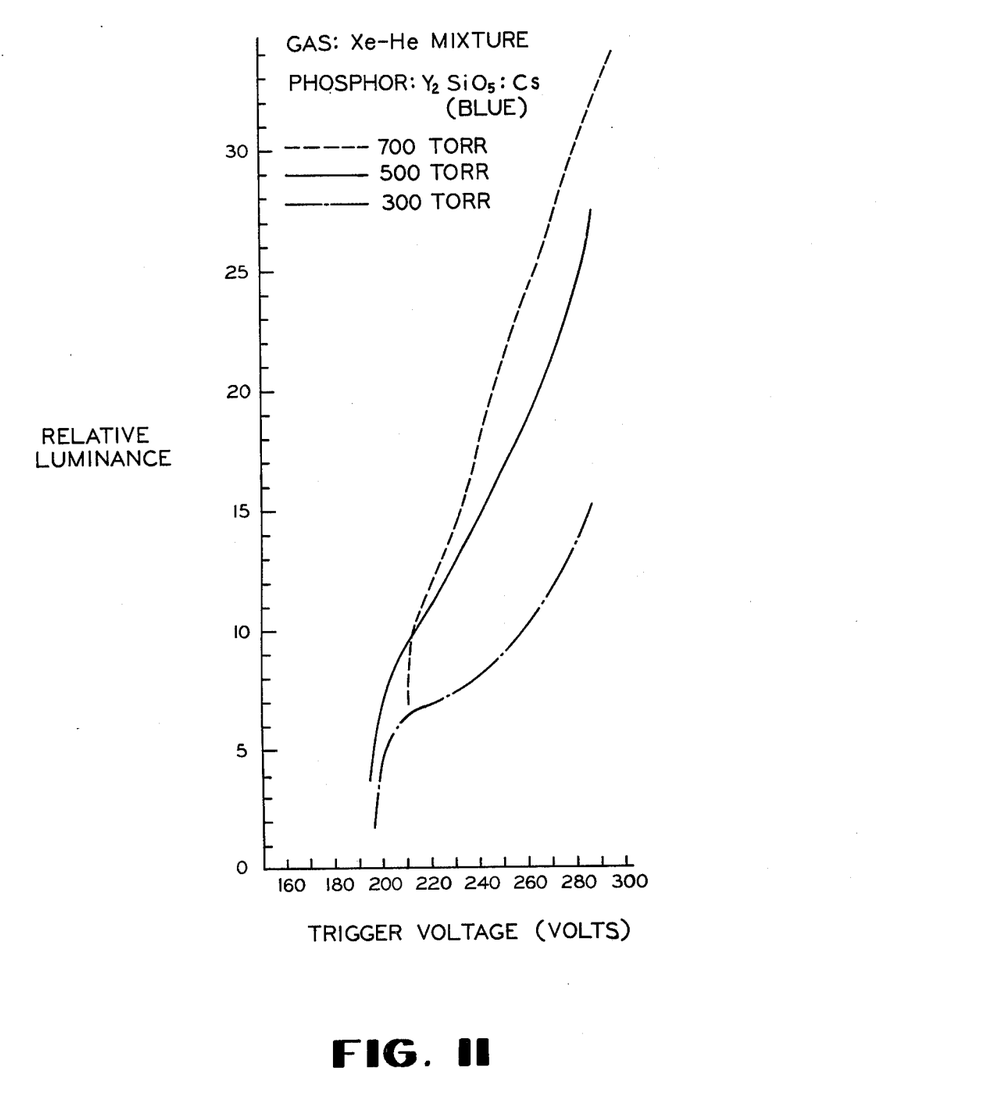
FIG. 11 is a graph of relative luminance versus trigger voltage for a gas discharge panel filled with a xenon-helium mixture.

FIG. 11 shows a graph of relative luminance versus trigger voltage for a panel filled with a xenon-helium mixture. Adequate variation in luminance can be obtained at pressures of several hundred torr, similar to the pressures normally used in panels intended for bistable memory mode operation. Eight gray scale levels each differing by a factor of $\sqrt{2}$ are normally considered adequate to produce good quality continuous tone pictures. This corresponds to a ratio of 16 to 1 for the largest to smallest luminance. Ratios larger than 32 to 1 (10 gray scale levels) have been obtained with this gray scale technique.

Figure 12:
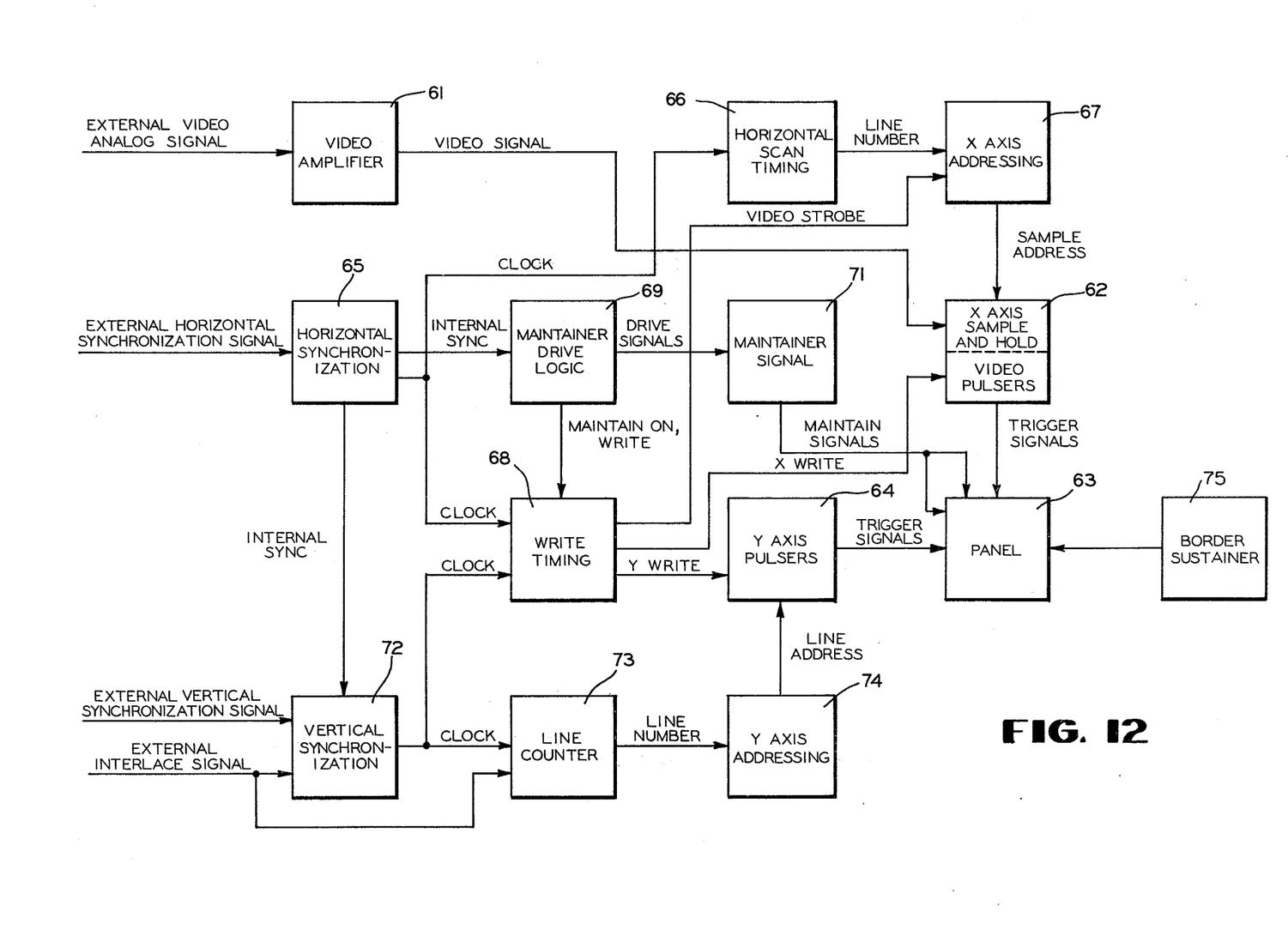
FIG. 12 is a block diagram of a circuit for generating gray scale in a gas discharge panel according to the present invention.

FIG. 12 shows a block diagram of a circuit for generating gray scale in a gas discharge panel according to the present invention. The gas discharge panel is written line-by-line along the Y axis as successive pluralities of trigger voltages representing lines of video information are applied to the X axis lines. The trigger voltages have magnitudes proportional to the successively sampled instantaneous magnitudes of an external video signal. If the panel is operated in the semi-memory mode with an alternating maintain voltage, the trigger voltages will generate sequences of discharges which continue for substantial numbers of maintain voltage cycles before dying out. If the panel is operated in a refresh mode, the average brightness of the light emitted is controlled by the magnitudes of the trigger voltages ot generate a gray scale display.

The circuit of FIG. 12 is supplied with the various components of a standard television signal including a video analog signal, a horizontal synchronization signal, a vertical synchronization signal and an interlace signal. The standard television picture employed in the United States has a width to height ratio of 4:3. The scanning sequence when looking at the picture tube starts in the upper left-hand corner and travels at a uniform rate from left to eight along lines that are spaced apart at a constant distance. when the end of a line is reached, the scanning spot quickly returns to the left to start a new line during which time the spot is blanked out. As the scanning spot travels back and forth across the picture tube, it also moves downwardly at a constant rate such that each line is slightly sloped and begins slightly lower than the end of the previous line. When the bottom of the picture is reached, the scanning spot quickly returns to the top of the picture while maintaining the horizontal motion previously described. However, the spot is blanked out during this return.

The scanning spot requires 1/60 of a second to travel from the top to the bottom of the picture and back again. During this time one field of 262.5 lines has been traced. Now a second field is traced wherein the lines lie between the lines of the first field such that the two fields are interlaced. The complete picture comprises 525 lines which have been traced in 1/30 of a second and is called a frame. Interlacing makes it possible to avoid noticeable flicker while ;using the lowest repetition frequency for the picture that will satisfactorily portray motion.

In the standard television picture, the blanking pulses for the horizontal retrace are allocated sixteen percent of the time available for scanning one line or about 10 microseconds. Thus the scanning spot move from left to right in 53.5 microseconds. Similarly, the vertical blanking pulses occupy between seven and 8 percent of the total field time, or about 1250 microseconds. After subtracting the blanking times, the number of active lines in the picture is approximately 485.

Synchronization between the scanning operations at the television picture transmitter and at the receiver is accomplished with horizontal and vertical synchronization pulses. The horizontal or line synchronization pulses are 5 microseconds long and are superimposed on the horizontal blanking pulses. The vertical synchronizing pulses are equal in length to the time required by three lines or approximately 19 horizontal synchronizing pulses. Horizontal synchronization is maintained during the presence of the vertical synchronizing pulses by serrations that break up the vertical synchronizing pulse into six "blocks." These serrations have twice the line frequency and are so timed that the rise of every other serration occurs at the instant the horizontal synchronizing pulse would have risen in amplitude if it had been present.

Field frequency irregularities due to the interlacing are minimized by introducing six equalizing pulses, just before and just after the six blocks formed by the serrations, in place of three horizontal synchronizing pulses. These equalizing pulses have twice the repetition frequency of the horizontal synchronizing pulses and are half as long. They maintain horizontal synchronization just as the serrations do and simultaneously provide brief time intervals just before and just after the "blocks" that are identical for both fields of the interlaced scanning pattern.

The standard television signal is modulated on a carrier wherein black is represented by an amplitude that is 75 per cent of the maximum envelope amplitude and white is represented by an amplitude that is 12.5 per cent of the maximum. The blanking pulses correspond to the black amplitude, while the synchronizing and equalizing pulses occupy the range between 75 per cent and 100 per cent of the maximum envelope amplitude.

The video signal is separated from the carrier by any conventional means and is applied as a video analog signal to a video amplifier 61. The amplifier 61 generates a video signal which is a replica of the external video analog signal and provides automatic gain control such that the maximum and minimum amplitudes of the video signal are constant for a wide range of input signal strengths. The video signal is applied to a plurality of X axis sample and hold circuits and video pulsers 62. Each of the X axis lines of a gas discharge display panel 63 is connected to a separate video pulser and associated sample and hold circuit. The sample and hold circuits are actuated in sequence to sample the video signal during the transmission of one line of video information and then store the samples. When the video signal is in the return portion between lines, a selected one of a plurality of Y axis pulsers 64 applies a portion of a trigger signal to an associated Y axis line of the panel 63. At the same time all of the X axis video pulsers apply the other portion of the trigger signal which is proportional in magnitude to the magnitude of the sampled video signal. In this manner the trigger voltages write the Y axis line discharge cells in the semi-memory mode to generate one line of the gray scale display.

The external horizontal and vertical synchronization signals and the external interlace signals are also separated from the television carrier by conventional means. The external horizontal synchronization signal is applied to a horizontal synchronization circuit 65 which generates signals to control the sampling of the video signal and the writing of the X axis panel lines. The horizontal synchronization circuit, hereinafter referred to as the horz. sync. circuit 65 generates a clock signal to a horizontal scan timing circuit 66. The timing circuit 66 includes counting means responsive to the clock signal for determining when and which one of the X axis sample and hold circuits should be actuated. The timing circuit divides the interval for the transmission of each line of video information into equal segments according to the number of X axis panel lines and sequentially generates line numbers to a X axis addressing circuit 67.

The clock signal from the horz. Sync. circuit 65 is also applied to a write timing circuit 68 to generate a video strobe signal to the X axis addressing circuit 67. The addressing circuit 67 may include a decoder which is responsive to the line number and the video strobe signal to generate a sample address signal to the circuit 62 to actuate one of the sample and hold circuits. Each sample and hold circuit is addressed in succession, starting with the one associated with the left most X axis panel line and ending with the right most X axis panel line, to sample the video signal and store the sample.

The horz. sync. circuit 65 also generates an internal sync signal to a maintainer drive logic circuit 69 which controls the generation of the maintain signals which are applied to the X axis lines and to the Y axis lines of the panel 63. The maintainer drive logic circuit 69 generates drive signals to a maintainer signal circuit 71 and a maintain on signal to the write timing circuit 68. The maintainer signal circuit 71 generates the maintain signals as a series of alternating wave forms which are applied to the X axis lines and to the Y axis lines of the panel 63. At the same time the write timing circuit responds to the "maintain on" signal to inhibit the video pulsers 62 and the pulsers 64. The maintain signals must be synchronized with the horizontal scan since the write pulse always occurs during the return portion and must follow a like polarity maintain signal. The maintain drive logic therefore generates a write signal to the write timing circuit after a predetermined number of maintain signal cycles.

The write timing circuit 68 is responsive to the write signal from the maintainer drive logic circuit 69 and the clock signal from the horz. sync. circuit 65 to generate a X write signal to all the X axis video pulsers 62. Thus all the discharge cells in a single horizontal line of the panel are written simultaneously as the video pulsers apply one portion of the trigger pulses to the X axis lines. The external vertical synchronization signal is applied to a vertical synchronization circuit 72. The vert. sync. circuit 72 responds to the external signal and an internal sync signal from the horz. sync. circuit 65 to generate a clock signal to a line counter 73. The line counter 73 generates line numbers to a Y axis addressing circuit 74, which numbers are advanced in sequence from the top line to the bottom line of the panel 63. The line counter 73 may include a counter which is incremented after each horizontal line is written to generate the line numbers.

The Y axis addressing circuit 74 may include a decoder which is responsive to the line number for generating a line address to actuate the selected Y axis pulser 64 for applying a portion of the trigger signal to the Y axis panel line. The clock signal from the vert. sync circuit 72 is also applied to the write timing circuit 68 to generate a Y write signal to the Y axis pulsers 62 to enable the addressed pulser to generate the trigger signal portion at the same time that the X axis video pulsers 62 generate the other portion of the trigger signal. The external interlace signal is applied to the vert. sync. circuit 72 and the line counter 73 to direct that a first of alternate Y axis panel lines is written and then a second field of the remaining Y axis lines is written to display one television picture frame.

The circuit of FIG. 12 also includes a border sustainer circuit 75 for conditioning the discharge cells which display the gray scale picture. Suitable border sustainer circuits are disclosed in U.S. Pat. No. 3,786,484 issued to J. L. Miavecz, U.S. Pat. No. 3,843,905 issued to D. D. Leuck et al and U.S. Pat. No. 3,894,263 issued to D. S. Wojcik.

In summary, the present invention relates to a method of and a circuit for obtaining variable intensity or gray scale in gas discharge display panels utilizing one discharge cell per resolution element. On a per cell basis, the first step of the method requires the application of a trigger voltage having a wave form with at least one dimension selected to cause a gas discharge proportional to the light intensity desired. The second step requires the subsequent application of an alternating current or polarity maintain voltage signal to the cell of a magnitude insufficient to initiate a gas discharge or to maintain a sequence of gas discharges for an indefinite length of time, said magnitude being sufficient to maintain a sequence of gas discharges of successively diminishing intensity for a number of cycles of said maintain voltage signal proportional to the trigger voltage selected dimension. If the two steps are repeated at a sufficiently high frequency, the human eye will integrate the individual light pulses to present an average brightness at the cell.

The above described method may be applied to a multiple cell gas discharge display/memory panel to display video information. A circuit for generating a variable intensity or gray scale display from a video information analog signal includes sample and hold means for sampling the video signal at a plurality of predetermined time intervals and storing the samples and a first pulser means for generating a trigger signal for each of the samples. See FIG. 12 X axis sample and hold and video pulsers circuits. The trigger signals have a dimension proportional to the magnitudes of the video signal when the associated samples where taken. The circuit also includes timing means, the horizontal scan timing circuit 66 and write timing circuit 68, for determining the predetermined time intervals and for actuating the first pulser means wherein the first pulser means applies the trigger signals to associated discharge cells of the panel to generate the gray scale display.

As disclosed, the discharge cells are defined by first and second electrode arrays, the X axis and the Y axis, wherein the first pulser means is connected to the first electrode array and a second pulser means, the Y axis pulsers circuit 64, is connected to the second electrode array. The first pulser means applies a first portion of each trigger signal to the first electrode array and the second pulser means applies a second portion of each trigger signal to a selected one of the second array electrodes. The timing means includes the line counter 73 and Y axis addressing circuit 74 for indicating the selected electrodes and actuating the second pulser means. Therefore, one line of video information is stored and then written along a selected line of discharge cells in the panel.

If the video information analog signal represents sequential lines of information, such as a television picture signal, the timing circuit can repetitively detect when the sample and hold means has stored a predetermined number of samples and indicate a different electrode of the second electrode array before actuating the first and second pulser means until all of the electrodes of the second electrode array have been selected. A standard television picture signal requires interlacing. Therefore, the timing means selects every other electrode from the top to the bottom of the second electrode array and then returns to the top to select the remaining electrodes in order.

The circuit also includes means for generating an alternating maintain voltage across the discharge cells, the maintainer drive logic circuit 69 and the maintainer signal circuit 71. The maintain voltage has a magnitude which is insufficient to initiate a gas discharge or maintain an indefinite sequence of gas discharges in the cells but is sufficient to maintain a finite sequence of gas discharges of decreasing magnitude. As shown in FIG. 3, the length of the gas discharge sequence is proportional to the magnitude of the trigger signal.

In accordance with the provisions of the patent statutes, the principle and mode of operation of the present invention has been explained and what is considered to represent its best embodiment has been illustrated and described. However, it is to be understood that the invention may be practiced otherwise than as specifically illustrated and described without departing from its spirit or scope. For example, the trigger signals have been illustrated as squarewave pulses having a constant width and a magnitude proportional to the magnitude of the video signal to be displayed. However, it has been discovered that the duration of the pulses and the shape of the pulses can also be varied to control the number of gas discharges in the sequence.

Although the present invention has been discussed in terms of driving the type of display panel disclosed in the previously referenced U.S. Pat. No. 3,499,167, it is to be understood that other types of display panels can also be utilized. For example, the monolithic gas discharge display device disclosed in U.S. Pat. No. 3,896,327 issued to J. D. Schermerhorn can be driven according to the method and circuit of the present invention so as to generate a variable intensity display.

It is also contemplated that the present invention be utilized to drive a gas discharge phosphor panel wherein the radiation from the gas discharge excites a phosphor which emits light in the visible range. Thusly, red, green and blue phosphors associated with individual discharge cells can be excited to generate a color television picture. Gas discharge panels utilizing phosphors are disclosed in U.S. Pat. No. 3,878,422 issued F. H. Brown et al and U.S. Pat. No. 3,909,657 issued to F. H. Brown.

Although the circuit of FIG. 12 is directed to the display of a television picture wherein the trigger or addressing voltage pulses are applied once to each horizontal line of cells during a frame, about every 33 milliseconds, the method of the present invention has been shown to operate in the range of about 100 microseconds to about 1 second. Therefore, if a television picture is to be displayed, the trigger or addressing pulses can be stored and applied one or more additional times to each horizontal line during the duration of a television picture frame. Such operation is called the refresh mode and requires additional memory circuits. Furthermore, the frequency of the maintain voltage wave form can range from about 10 kHz to about 100 kHz wherein the maintain voltage frequency is an integral multiple of the trigger voltage frequency.

What is claimed is:

1. A method of obtaining variable light intensity from a gas discharge display/memory cell, said method comprising the steps of:
    applying a trigger voltage signal across the cell having at least one dimension selected to cause a gas discharge proportional to the light intensity desired; and
    applying an alternating current maintain voltage signal to the cell of a magnitude insufficient to initiate a gas discharge or to maintain a sequence of gas discharges of relatively constant intensity for an indefinite length of time, the maintain voltage magnitude being sufficient to maintain a sequence of gas discharges for a number of cycles of the maintain voltage signal proportional to the selected dimension of the trigger voltage signal.

2. A method according to claim 1 wherein the selected dimension is the duration of the trigger voltage signal applied.

3. A method according to claim 1 wherein the selected dimension is the magnitude of the trigger voltage signal applied.

4. A method according to claim 1 wherein said steps are repeated at a frequency sufficient to cause the human eye to integrate the individual light pulses from the gas discharges as an average brightness at the cell.

5. A method of obtaining a gray scale display from a multiple cell gas discharge display/memory panel, said method comprising the steps of:
    applying a first voltage signal to a selected cell, the first voltage having a wave form with at least one dimension selected to cause a gas discharge in the cell proportional to the light intensity desired; and
    applying a series of alternating polarity second voltage signals to the selected cell, the second voltage signals having a magnitude insufficient to initiate a gas discharge or to maintain a sequence of gas discharges of relatively constant intensity for an indefinite length of time, the second voltage magnitude being sufficient to maintain a sequence of gas discharges for a number of cycles of the second voltage signal proportional to the selected dimension of the first voltage signal.

6. A method according to claim 5 wherein following ones of the sequence of gas discharges emit progressively diminishing levels of light intensity.

7. A method according to claim 5 wherein the trigger voltage signal wave form has a predetermined magnitude and a width proportional to the light intensity desired.

8. A method according to claim 5 wherein the trigger voltage signal wave form has a predetermined width and a magnitude proportional to the light intensity desired.

9. A method according to claim 8 wherein a plurality of the first voltage signals, at least one of which has a magnitude different from the magnitude of all the others, are applied to a plurality of associated cells and wherein the second voltage signal is applied to all of the associated cells.

10. A method according to claim 9 wherein the associated cells define a straight lline on the face of the panel.

11. A circuit for generating a gray scale display in a multiple cell gas discharge display/memory panel from a video information analog signal, comprising:

sample and hold means for sampling said video signal at plurality of predetermined time intervals and storing said samples;

first pulser means for generating a trigger signal for each of said samples, said trigger signals having wave forms with at least one dimension proportional to the magnitudes of said video signal when the associated samples were taken;

means for applying said trigger signals from said first pulser means to associated cells of said panel; and timing means for determining said predetermined time intervals and for actuating said first pulser means wherein said trigger signals are applied to said associated cells of said panel to generate said gray scale display.

12. A circuit according to claim 11 wherein said cells are defined by first and second electrode arrays, said first pulser means is connected to the electrodes of said first array for applying a first portion of each of said trigger signals thereto, said circuit includes second pulser means connected to the electrodes of said second array for applying a second portion of each of said trigger pulses to a selected one of said second array electrodes and said circuit includes means associated with said timing means for indicating said selected electrode to said second pulser means and for actuating said second pulser means.

13. A circuit according to claim 12 including means associated with said timing means to repetitively detect where said sample and hold means has stored a predetermined number of samples and wherein said means for indicating said selected electrode indicates a different electrode of said second electrode array before actuating said second pulser means until all of the electrodes of said second electrode array have been selected.

14. A circuit according to claim 12 including means associated with said timing means to repetitively detect when said sample and hold means has stored a predetermined number of samples and indicates said selected electrode of said second electrode array before actuating said second pulser means to generate an average brightness at each of said associated discharge cells.

15. A circuit according to claim 11 wherein said first pulser means generates trigger signal wave forms which are square waves having a predetermined duration.

16. A circuit according to claim 11 wherein said first pulser means generates trigger signal wave forms which are square waves having a predetermined magnitude.

17. A circuit according to claim 11 including means for generating an alternating maintain voltage across said cells, said maintain voltage having a magnitude insufficient to initiate a gas discharge or maintain an indefinite sequence of gas discharges in said cells but sufficient to maintain a finite sequence of gas discharges of decreasing magnitude wherein said timing means actuates said first pulser means to apply said trigger signals after the application across said cells of a portion of said maintain voltage having the same polarity as said trigger signals.

18. A circuit for generating a variable intensity display in a multiple cell gas discharge display panel from a video information analog signal, said panel having an ionizable gas enclosed between first and second opposed electrode arrays wherein at least one of said electrode arrays is separated from said gas by a charge collectable dielectric surface and wherein proximate portions of respective electrodes of said first and second arrays define said cells, said circuit comprising:

means connected to said first and second electrode arrays for generating an alternating maintain voltage across said cells, said maintain voltage having a magnitude insufficient to initiate a gas discharge or maintain an indefinite sequence of gas discharges in said cells but sufficient to maintain a finite sequence of gas discharges of decreasing magnitude;

sample and hold means for sampling said video signal at a plurality of predetermined time intervals and storing said samples first pulser means connected between said sample and hold means and said first electrode array for generating a trigger signal for each of said samples, said trigger signals having wave forms with at least one dimension proportional to the magnitudes of said video signal when the associated samples were taken; and timing means for determining said predetermined time intervals and for actuating said first pulser means wherein said first pulser means applies said trigger signals to said first electrode array of said panel to generate said variable intensity display.

19. A circuit according to claim 18 wherein said first pulser means generates a first portion of each of said trigger signals having a wave form dimension proportional to said video signal, said circuit includes a second pulser means connected to said second electrode array for generating a second portion of each of said trigger signals having a predetermined wave form and said circuit includes means associated with said timing means to actuate said first and second pulser means to sum said first and second trigger signal portions across said cells to generate said variable intensity display.

20. A circuit according to claim 18 wherein said first pulser means generates a first portion of each of said trigger signals, said circuit includes a second pulser means connected to said second electrode array for generating a second portion of each of said trigger signals and said timing means actuates said first and second pulser means to sum said first and second trigger signal portions across a plurality of said cells defined by proximate portions of all of the electrodes of said first electrode array and a selected one of the electrode of said second electrode array.

21. A circuit according to claim 20 wherein said circuit includes means associated with said timing means to detect when said sample and hold means has stored a predetermined number of samples and signals said timing means to actuate said first and second pulser means.

22. A circuit according to claim 20 said circuit includes means associated with said timing means to detect when a predetermined portion of said video signal has been sampled, select said one electrode of said second electrode array and signal said timing means to actuate said first and second pulser means.

23. A circuit according to claim 20 wherein said circuit includes means associated with said timing means to repetitively detect when a predetermined portion of said video signal has been sampled, select a different electrode of said second electrode array and signal said timing means to actuate said first and second pulser means until all of the electrodes of said second electrode array have been selected.

24. A circuit according to claim 23 wherein every other electrode is selected in succession from one end of said second electrode array to the other end and the remaining electrodes are selected in succession from said one end to said other end.

25. A circuit according to claim 24 wherein said video information analog signal is a standard television picture transmission signal.

26. A method of producing variable light intensity in a multiple gaseous discharge cell a.c. plasma panel which comprises:
    applying a first alternating voltage wave form to all discharge cells of the panel, the voltage magnitude being less than the lower limit of the bistable range for all panel discharge cells; and
    applying a second voltage pulse to a selected discharge cell during application of the first voltage alternations sufficient to initiate a sequence of discharge pulses of diminishing intensity which gradually decay, the length of time of each discharge sequence being a function of the magnitude of the voltage pulse, the second voltage pulse being applied repetitively such that the average light intensity emitted from the selected cell is controlled by the wave form of the voltage pulse.

27. The method of claim 26 wherein the time interval between application of the repetitively applied second voltage pulse ranges from about 100 microseconds to about 1 second.

28. The method of claim 26 wherein the time interval between application of the repetitively applied second voltage pulse is about 33 milliseconds.

29. The method of claim 26 wherein the frequency of the first alternating voltage wave form ranges from about 10 kHz to about 100 kHz.

30. The method of claim 26 wherein the frequency of the first alternating voltage wave form is an integral multiple of 15.75 kHz.

31. A method of addressing a multiple gaseous discharge cell a.c. plasma matrix display panel, including a first electrode array and a second electrode array, with video information which comprises:
    applying a first alternating voltage wave form to all cells of the matrix display panel whose magnitude is less than the lower limit of the bistable range sufficient to sustain a sequence of discharges which continues indefinitely during application of the first voltage alternations; and
    addressing the panel one electrode of the first electrode array at a time sequentially by applying a first partial addressing voltage pulse to the selected electrode of the first electrode array and applying second partial addressing pulses to a plurality of electrodes of the second electrode array, the wave forms of the second pulses corresponding to the desired light intensity, the composite first and second partial addressing pulses being of a polarity the same as that of the immediately preceding portion of the first alternating voltage wave form so that the partial addressing pulses for a selected first electrode do not interfere with sequences of discharges in progress on other first electrodes.

32. The method of claim 31 wherein the time interval between the addressing of successive first electrodes is about 63.5 microseconds and the addressing pulses are applied once each 33 milliseconds to each cell.

33. The method of claim 31 wherein the time interval between the addressing of successive first electrodes is about 63.5 microseconds and electronic memory is used to apply the addressing pulses at a more rapid rate than once every 33 milliseconds to each cell.

34. The method of claim 31 wherein another method of obtaining variable intensity is utilized in combination with said method.

35. The method of claim 34 wherein said other method is spatial gray scale.

36. The method of claim 34 wherein said other method is time modulation.

* * * * *